United States Patent [19]

France

[11] Patent Number: 4,715,476
[45] Date of Patent: Dec. 29, 1987

[54] RESET MECHANISM RESPONSIVE TO LOSS OF TORQUE

[75] Inventor: Howard G. France, Watertown, Conn.

[73] Assignee: North American Philips Corporation, New York, N.Y.

[21] Appl. No.: 913,174

[22] Filed: Sep. 26, 1986

[51] Int. Cl.$^4$ ............................................. F03G 1/00
[52] U.S. Cl. .................................. 185/40 R; 74/516; 185/39; 318/160
[58] Field of Search ............... 185/37, 39, 40 R; 74/2, 74/516; 49/274; 251/129.11; 16/1 C; 267/20 R, 167; 318/160

[56] References Cited

U.S. PATENT DOCUMENTS

| 683,816 | 10/1901 | Towers | 49/274 X |
|---|---|---|---|
| 2,112,218 | 3/1938 | Gille | 318/160 X |
| 2,129,221 | 9/1938 | Lewis | 16/1 C X |
| 2,502,830 | 4/1950 | Crise | 318/160 X |
| 4,203,573 | 5/1980 | Boss | 251/129.11 |

FOREIGN PATENT DOCUMENTS 2700928 7/1977 Fed. Rep. of Germany ......................... 251/192.11

*Primary Examiner*—Allan D. Hermann
*Attorney, Agent, or Firm*—F. Brice Faller

[57] ABSTRACT

Reset mechanism comprises a base, a spring arm rotatable about an axis through the base, and an extension spring fixed to the base at one end and the spring arm at the other end. The spring passes around two ball bearings on studs on the base to permit use of a long spring in a small space without binding. The spring arm is limited to rotation between first and second angular positions, the angle between the spring and the spring arm becoming more acute as the arm is rotated from the first position to the second position. The torque required to hold the arm at the second position is considerably less than the torque required to initiate rotation from the first position.

7 Claims, 4 Drawing Figures

RESET MECHANISM RESPONSIVE TO LOSS OF TORQUE

BACKGROUND OF THE INVENTION

The present invention relates to a reset mechanism responsive to loss of torque, with applicability for resetting a device when a motor loses power.

In some types of equipment, it is desirable that an element retract if power is removed from a drive motor, without any use of additional or continuing power. Such "fail-safe mechanisms" should not increase the power requirement of the motor greatly.

Spring return mechanisms are well known for many purposes. They suffer the typical disadvantage that, as spring displacement is increased from the "reset" or power-off position to the normal operating position, the spring force increases linearly with displacement. When resetting is partially accomplished, the available spring force is relatively low.

SUMMARY OF THE INVENTION

The present invention relates to a fail-safe or reset device which can effect immediate return of an arm or member upon loss of power. This is accomplished through a reset mechanism driven by a motor which receives its power from the system being protected.

The mechanism has as an advantage, the requirement of less torque in the fully wound or power mode than in the unwound or starting mode. Thus, high voltage or power is needed only under start-up and setting of the device; thereafter substantially less voltage or power is needed to provide the holding torque.

The mechanism utilizes an overcenter spring approach to achieve the cited advantages. This means that the holding torque is a function of the angle between a spring arm and an extension spring attached to the distal end thereof. For the design to work well, it is desirable for the spring force to be relatively uniform over a given length of stretching. This requires a relatively long spring, which must be fit in a tight environment. The invention solves this problem by running the spring around bearings between a fixing point and the spring arm. When a coil spring and ball bearings are used, all the spring coils can function properly, so the spring behaves essentially as it would if straight. Without bearings, for example if it were simply routed around studs, binding could result, so that only the coils between the stud and the spring arm would be active.

DETAILED DESCRIPTION OF THE PREFERRED EMBODIMENT

Figure 1:
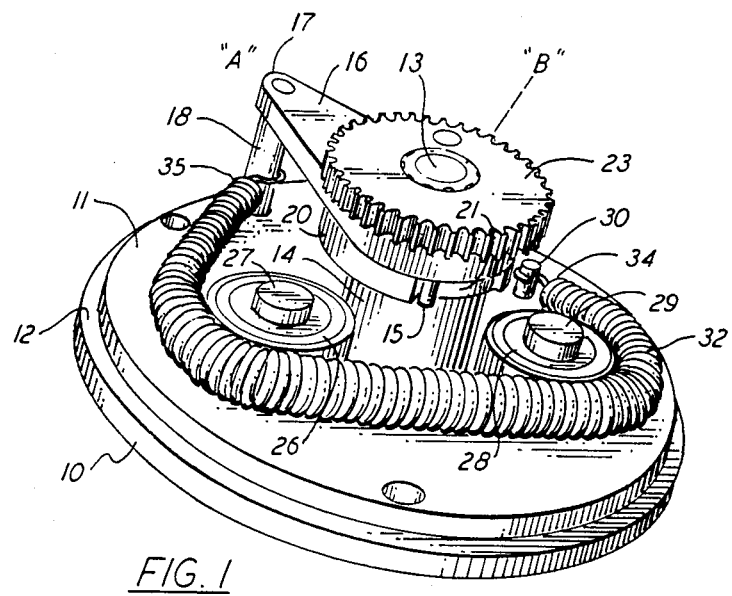
FIG. 1 is a perspective of the mechanism.
Figure 3:
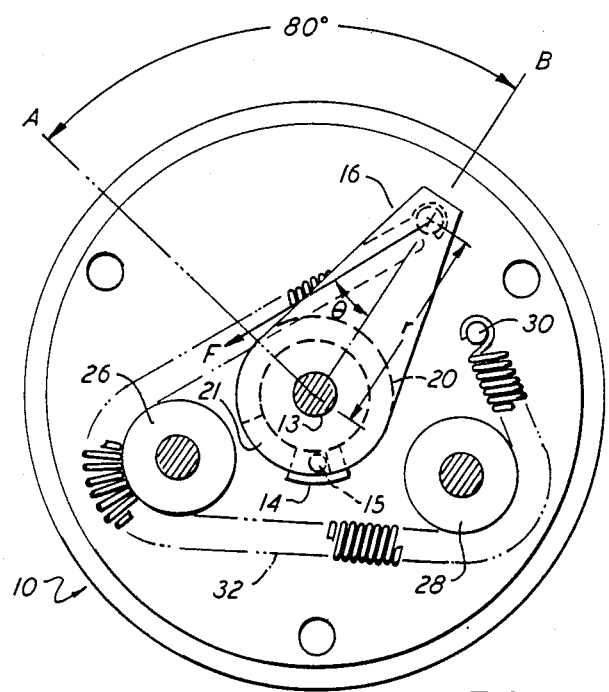
FIG. 3 is a plan view of the mechanism with the arm in the second angular position.

FIG. 1 depicts base 10, having a mounting surface 11, which is conveniently machined with flange 12 to facilitate reception on a cylindrical enclosure. A shaft 13 is journaled to the base 10 through pedestal 14 fixed thereto. An arm 16 fixed to shaft 13 extends radially therefrom to a distal end 17 wherein pin 18 fixed therein extends toward mounting surface 11. A limiting plate 20 fixed on shaft 13 has an arcuate recess 21 which cooperates with pin 15 upstanding from pedestal 14 to limit rotation of the shaft. The arm 16 is thus limited to movement through an arc from a first angular position "A" (as shown) to a second angular position "B" (FIG. 3). A gear 23 fixed to the top of shaft 13 serves as means for transmitting torque from a stepping motor or the like, whereby the arm is rotated clockwise from the position shown. First bearing 26 and second bearing 28 are set on respective shafts 27, 29 and are most conveniently roller bearings or needle bearings for minimal resistance. An elongate extension spring 32, preferably a coil spring, is fixed at one end 34 to stud 30 and at the other end 35 to pin 18, extending around first and second bearings, 26, 28 between the ends 34, 35.

Figure 1A:
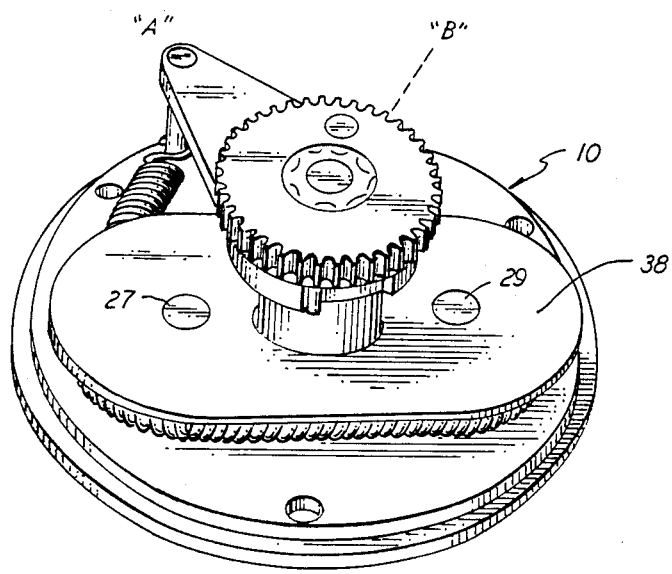
FIG. 1A is a perspective with the retainer in place.

FIG. 1A shows the mechanism with retainer 38 fixed on shafts 27, 29; the retainer 38 extends beyond spring 32 and serves to retain it on bearings 26, 28.

Figure 2:
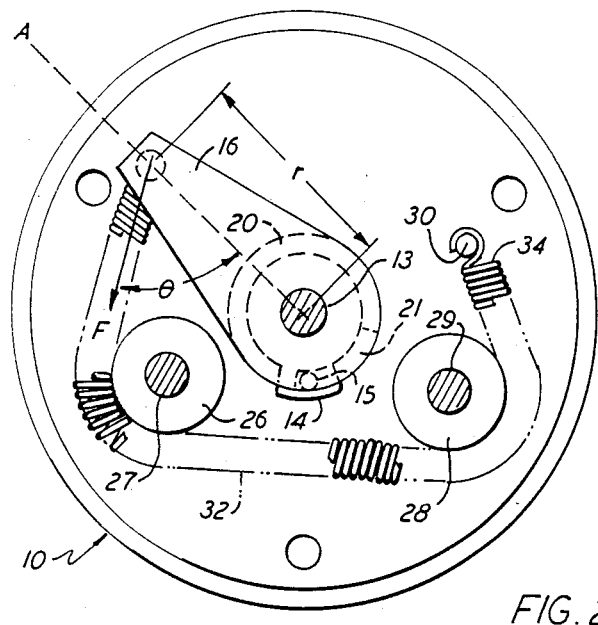
FIG. 2 is a plan view of the mechanism with the arm in the first angular position.

FIG. 2 shows the mechanism with arm 16 at first angular position "A". The spring is in tension so that a substantial torque, say 80 oz-in, will be required to rotate the arm from this position. In other words, the unstretched length of the spring is less than that shown. Since the placement of bearings 26, 28 permits the use of a relatively long spring compared to the size of the base and the angular displacement of the arm, the spring force does not increase substantially as the arm 16 is rotated to second angular position "B", shown in FIG. 3. The torque required to rotate the arm is calculated by the equation $T = Fr \sin \theta$, where r is the length of the arm, F is the spring force, and $\theta$ is the angle between r and the direction in which the spring force is applied. As $\theta$ becomes more acute, the sine function eventually results in a decrease in torque necessary to rotate the arm. Thus, in the position of FIG. 3, the torque required to hold the arm in that position will be substantially less than the torque required to initiate rotation from the position of FIG. 2.

The foregoing is exemplary and not intended to limit the scope of the claims which follow.

What is claimed is:

1. A reset mechanism responsive to loss of torque comprising
   a base;
   an arm rotatable about an arm axis through said base, said arm being rotatable through an arc from a first angular position to a second angular position, said arm extending radially from said axis to a distal end;
   first bearing means on said base substantially opposite said arm axis from said second angular position;
   an extension spring fixed at one end to a fixing point on said base and at its other end to a fixing point on said arm spaced from said arm axis, said spring extending around said first bearing means, said spring forming a first angle with said arm when said arm is in said first position, said spring forming a second angle with said arm when said arm is in said second position, said second angle being substantially smaller than said first angle.

2. A reset mechanism as in claim 1 wherein said spring is in tension when said arm is at the first angular position, the spring constant and second angular position being chosen so that the torque required to overcome the spring force decreases as the arm is moved from the first angular position to the second angular position.

3. A reset mechanism as in claim 1 further comprising limiting means cooperable between said base and said arm to limitation rotation to movement through said arc from said first angular position to said second angular position.

4. A mechanism as in claim 1 further comprising second bearing means on said base angularly between said fixing point as said base and said first bearing means, and opposite said arc, said spring extending around said second bearing means.

5. A mechanism as in claim 4 wherein said second bearing means is substantially opposite said shaft means from said first angular position.

6. A mechanism as in claim 1 wherein said arm is spaced from said base, said arm having a pin extending from the distal end thereof toward said base, said other end of said spring being fixed to said pin.

7. A mechanism as in claim 1 further comprising a gear fixed to said shaft means, said gear providing means for transmitting torque from a motor or the like.

* * * * *